Feb. 19, 1935.    N. L. DERBY    1,991,496
PROCESS OF MAKING A COMPOUND METALLIC INLAID STRUCTURE
Filed Jan. 13, 1932    3 Sheets-Sheet 1
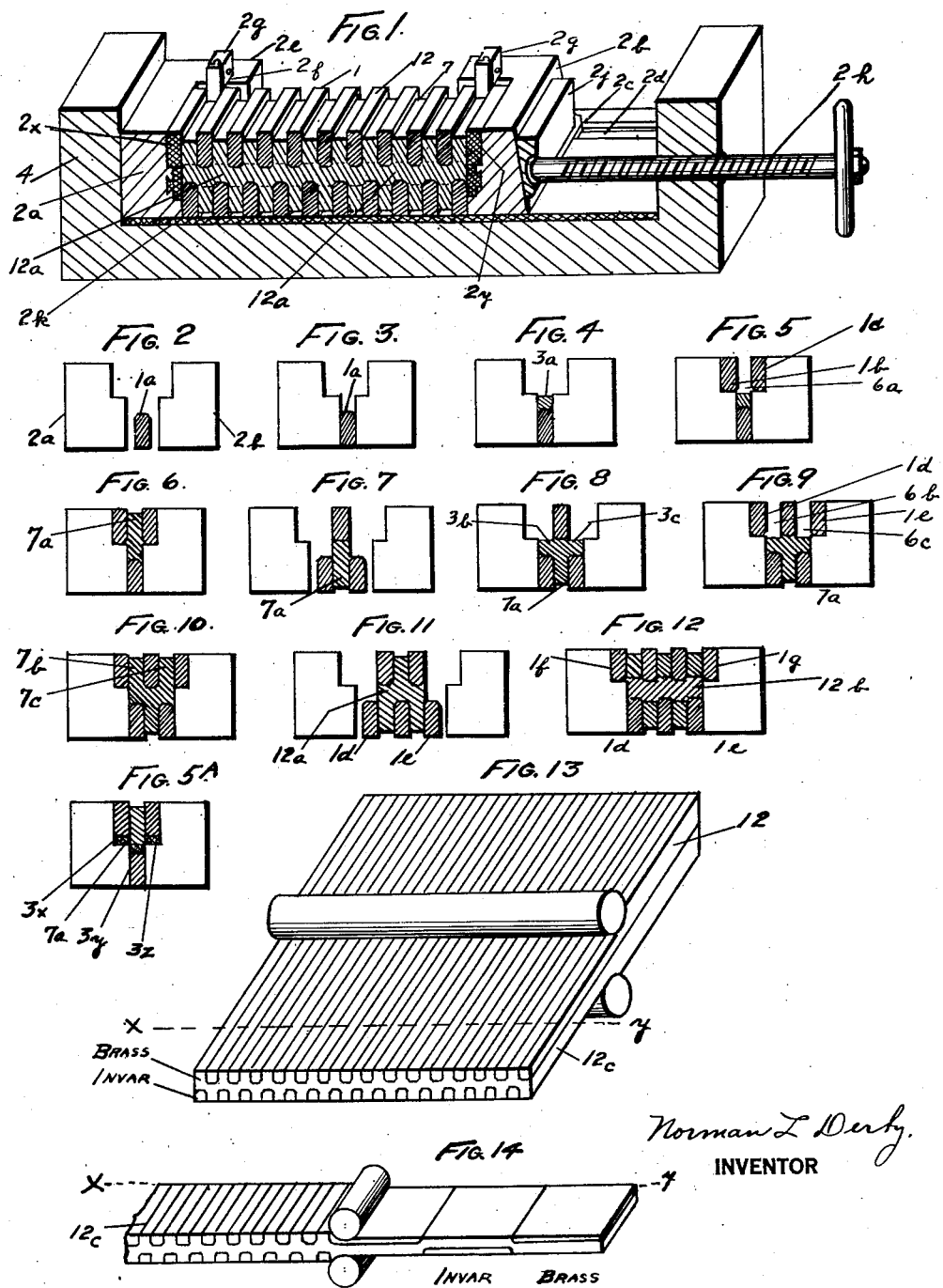
Norman L. Derby.
INVENTOR

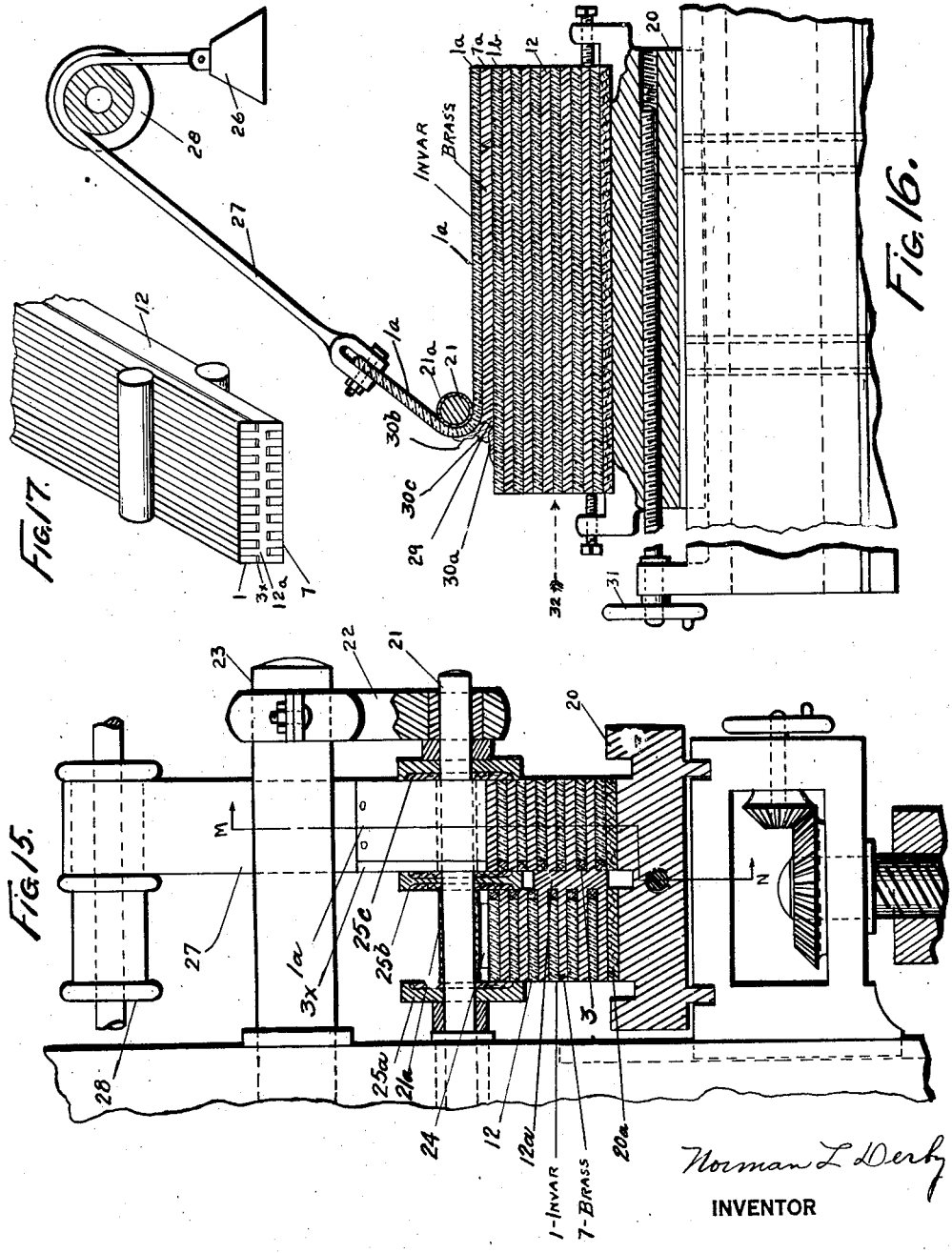

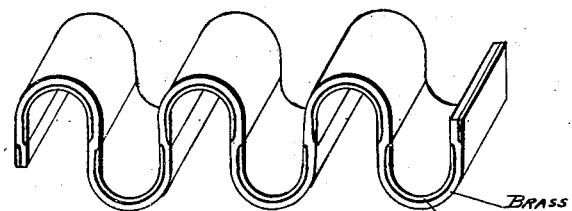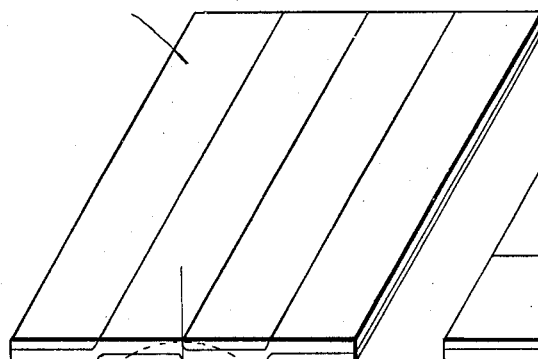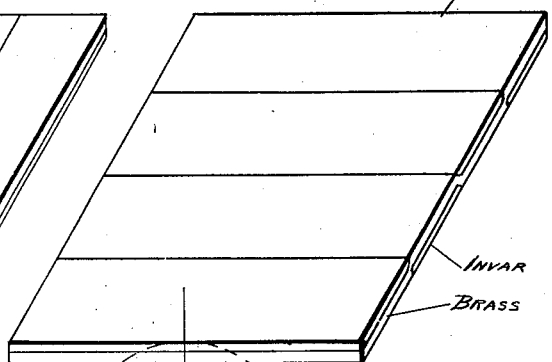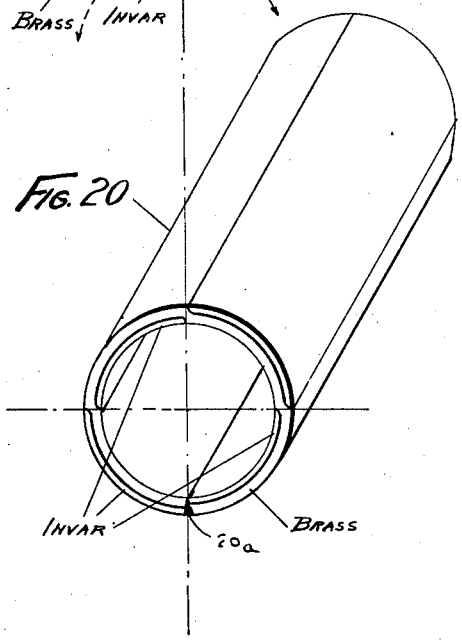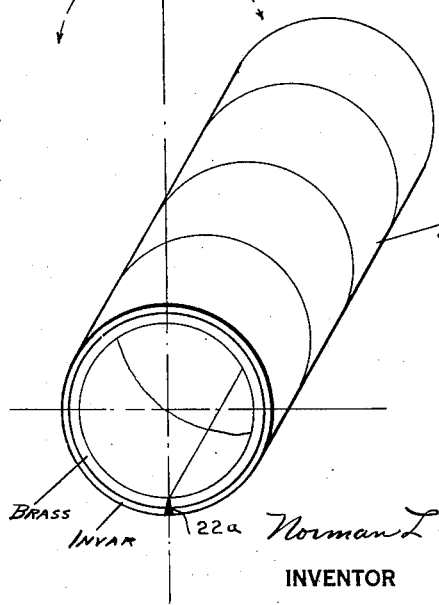

Patented Feb. 19, 1935

1,991,496

UNITED STATES PATENT OFFICE 1,991,496

PROCESS OF MAKING A COMPOUND METALLIC INLAID STRUCTURE

Norman L. Derby, Jackson Heights, N. Y.

Application January 13, 1932, Serial No. 586,417

7 Claims. (Cl. 29—188)

My invention relates to a process of making a compound metallic structure and in particular to a process of forming an inlaid structure comprising dissimilar metal bodies having different coefficients of heat expansion. Specifically, the invention relates to a process for the manufacture of compound thermostatic metal having at least one of the component metals divided.

In my previous patent applications Serial No. 492,707, filed November 1, 1930, and Serial No. 559,186, filed August 25, 1931, I have described a number of different arrangements of a compound thermostatic element having at least one of its component metals divided and this application is a continuation of the above mentioned applications.

The particular object of my present invention is to provide an improved process for the manufacture of compound thermostatic elements having at least one of the component metals divided.

Another object of my invention is to provide an improved process for the economical manufacture of an inlaid structure comprising dissimilar metal bodies having different coefficients of heat expansion.

In carrying out my invention I place strips of one metal in spaced relation to each other and fuse into the spaces another metal, or other metals by a welding process which I preferably carry out with an oxy-acetylene flame or torch. The completed compound structure is a slab or mat of high expansion metal having a number of parallel invar strips inlaid or imbedded in opposite broad faces thereof.

The novel features of my invention which I believe to be patentable are definitely indicated in the claims appended hereto. The invention itself will be best understood from the following description taken in conjunction with the accompanying drawings in which—

Fig. 1 is a transverse sectional view of an apparatus used in assembling and joining the various members of a compound thermostatic ingot into a unitary structure by welding.

Figs. 2 to 12 inclusive, diagrammatically represent the principal steps in my improved process of making compound thermostatic ingots having one of the metals divided and imbedded in another metal, or other metals.

Fig. 13 is a perspective view of a compound thermostatic ingot being reduced by cold rolling longitudinally.

Fig. 14 is a section of the rolled ingot of Fig. 13 being reduced by cold rolling laterally.

Fig. 15 is a side elevation partly in section of a milling machine employed in a modification of the process of making compound thermostatic ingots.

Fig. 16 is a front elevation partly in section of the milling machine and the compound thermostatic ingot in the course of construction.

Fig. 17 is a perspective view of the compound ingot being rolled down longitudinally.

Fig. 18 is a perspective view of a completed corrugated thermostatic element made from the rolled ingot of Fig. 14 or Fig. 17.

Fig. 19 is a compound inlaid thermostatic metal slab similar to Fig. 14 or Fig. 17.

Fig. 20 is a tubular thermostatic element made from the slab Fig. 19.

Fig. 21 is another thermostatic metal slab similar to that shown in Fig. 19.

Fig. 22 is a tubular thermostatic element suitable for making a collapsible bellows, constructed from the slab Fig. 21.

When a strip of steel having a low coefficient of thermal expansion is joined face to face to a strip of brass which has a relatively high thermal expansion and the thermostatic strip thus formed heated, the steel tends to curve away from the brass. The thermostatic metal which is the subject of this invention is equivalent to a series of compound thermostatic strips joined end to end, and since in one compound strip the brass is on the opposite face from that of an adjacent strip, alternate strips tend to deflect in opposite directions when heated.

In this thermostatic metal it is proposed to use 36% nickel steel, known as invar steel, as the low expansion metal, and preferably a lead free brass relatively high in copper as the high expansion metal. Commercial 66—34 yellow brass will answer the purpose.

In the preferred method of making the thermostatic metal a strip of hot drawn invar steel 1a, Fig. 2, having two relieved corners, is first heated to a bright red, or slightly above 1400 F.; it is then entirely covered with a slight sprinkling of flux, such as borax, which melts on the steel at 1400 F. The fluxed strip of invar while still at a bright red heat is clamped between two refractory step blocks 2a and 2b, Figs. 2 and 3 with the relieved edges uppermost. A small longitudinal section of the exposed face of the invar is next brought up to the fusion temperature with the oxy-acetylene flame and a deposit of molten brass from a filler rod is welded to the fused section of invar by the oxy-acetylene flame. This same procedure of bringing a section of the invar strip up to the fusion temperature and then welding to it molten brass, is followed until a continuous layer of brass has been welded completely along the face of the invar. The deposited brass is represented at 3a Fig. 4. Next, as shown in Fig. 5, two more strips of heated and fluxed invar 1b and 1c are positioned on the steps of blocks 2a and 2b, spaced apart by refractory wedge 2g—Fig. 1 with a corresponding wedge on the opposite side of the ingot (not shown), then a small longitudinal section of the invar side walls and the brass base of recess 6a are brought up to fusion temperature with the oxy-acetylene flame and molten brass from a filler rod is deposited and welded to the fused section. This process of bringing a section of the walls of the recess up to fusion temperature and then depositing molten brass at the fused section is followed until a layer of brass has been deposited the full length of the recess. The same procedure is followed for depositing additional layers on top of the first until the recess 6a is filled with brass 7a to within a short distance of the top, thus producing the structure shown in Fig. 6.

Next the ingot structure shown in Fig. 6 is inverted as shown in Fig. 7, and clamped between the two refractory step blocks and additional layers of brass 3b and 3c approximately flush with the steps of the blocks are progressively fused to the ingot as shown in Fig. 8. Next two additional strips of heated and fluxed invar 1d and 1e are positioned on the steps of the blocks as shown in Fig. 9, and then molten brass 7b and 7c is progressively fused into recesses 6b and 6c as shown in Fig. 10 in the same manner as described for filling recess 6a. Once again the partly completed ingot is inverted as shown in Fig. 11 and brass fused on top of invar strips 1d, 1e to a depth which brings the brass deposit approximately flush with the steps of the blocks and then two more strips of invar 1f and 1g are positioned on the steps of the blocks and additional molten brass is fused into recesses made thereby which brings the ingot to the stage of completion shown in Fig. 12. The same procedure as described above for building up the ingot is followed until a compound ingot like that shown at 12, Fig. 1 has been produced.

Fig. 1 represents the ingot 12 positioned in a jig or apparatus used to facilitate carrying out the various operations of building up the compound ingot so that all the parts may be assembled in perfect alignment with ease.

The apparatus, as shown in the transverse sectional view Fig. 1 comprises a channel like metallic frame 4 in which the refractory step blocks 2a and 2b, clamping the ingot 12 are placed. The step blocks have projecting lugs 2c extending from their base and engage with a sliding fit the transverse grooves 2d in the floor of the frame member. This arrangement keeps the step blocks always parallel, allowing only lateral movement. The blocks also have integral side members 2e with a vertical recess 2b therein, positioned to receive a refractory faced metallic wedge 2g which projects into the space between two adjacent invar strips. This wedge acts as a gauge for spacing the invar strips; it also acts as a dam to prevent the molten brass from running out of the recess; and in conjunction with the tightened pressure screw 2h and the pressure plate 2j, the wedge prevents the members of the ingot from warping out of shape when subjected to changes of temperature during the process of welding the members into a unitary structure.

It is to be noted that Fig. 1 represents a section only of the actual apparatus and ingot. There are similar wedges, grooves etc. on the opposite side of the apparatus (not shown). Parts of the apparatus which might come in contact with the molten metal being deposited are preferably made of a refractory material such as fine grained carborundum to prevent the molten metal from adhering thereto. Such parts include the step blocks 2a and 2b wedges 2g, floor slab 2k and end strips 2x and 2y.

After each new pair of recesses have been filled with molten brass and allowed to freeze solid, the tension is relieved on the ingot by turning back the pressure screw and removing the wedges, then the ingot is turned up-side-down or inverted, two more invar strips are added, the wedges replaced, the screw retightened, then the process of filling in the spaces with molten brass is repeated as explained before and illustrated in the Figs. 2 to 12 inclusive. When we come to the last stage of building up the ingot, refractory strips 2x and 2y are placed on the steps of the blocks instead of invar strips so that the last spaces may be filled with brass without adding any invar strips.

It is to be understood that where brass from a filler rod is joined to the invar or to the brass already deposited in a recess, the joint is a fusion or welded union. A film of the invar is brought up to fusion temperature and a film of the brass already deposited is brought to the molten state with the oxy-acetylene flame before molten brass from the filler rod is deposited.

It will be noticed that the brass fused into the recess between invar strips as shown in Fig. 1 is not brought flush with the invar. It is apparent that if an attempt were made to bring the brass flush with the invar an uneven surface would result, making it next to impossible to assemble the parts true during the building up of the ingot, and inverting it at intervals.

After the desired number of invar strips have been joined to the compound ingot as shown in Fig. 1, the shallow grooves in one broad face are filled with molten brass welded therein flush with or slightly above the top of the invar. When this operation is completed we have a rectangular ingot with one broad level face containing parallel shallow grooves while the other broad face has its grooves filled with brass and the surface is more or less bumpy and irregular. The broad grooved surface is used as a base to set the ingot on a magnetic chuck, then the opposite broad face is ground or machined parallel with the base and the side faces are trued up, each side being machined to form a right angle with adjacent surfaces. Finally, the grooves in the base surface are filled with molten brass welded thereto, and then this face is machined parallel with the opposite surface.

The ingot is now ready for the rolling operation shown in Fig. 13. It is cold rolled first longitudinally. Then after several passes through the rolls the ingot is annealed at from 1200 F. to 1250 F. and allowed to cool slowly in air. It is then cleaned in a pickling solution such as a mixture of sulphuric and hydrochloric acid, washed free of the acid and any loose scale, then dried. After a number of alternating rolling and annealing operations the ingot will have been reduced to the desired thickness. It is then cut off into lateral slabs 12c on line x—y—

Fig. 13. Rolling the metal in two directions imparts a grain to it in both directions which gives it greater strength to resist bending strains when fabricated into thermostatic elements.

Any metal having a relatively high coefficient of heat expansion and suitable for use as a filler rod in welding invar with an oxy-acetylene flame may be used to replace the brass in the bimetallic compound ingot, provided it can be reduced by rolling after being welded to the invar. For instance I may use instead of brass, Monel metal, copper coated Armco ingot iron, nichrome steel, Everdur, Tobin bronze or 18—8 stainless steel filler rod as the high expansion deposited metal, still using hot rolled or drawn invar strips as the low expansion metal in each case. Hot drawn invar is preferred to cold rolled invar because there is less tendency for it to warp due to rolling strains when heated up to the welding temperature and the strips can be fabricated at the mill to close tolerances which is very desirable.

In addition to bimetallic ingots I propose to make trimetallic ingots using the process of connecting and filling spaces between strips of metal held in spaced relation to one another with other metal progressively fused in place, described above for making bimetallic ingots, however, in this case the center section 12a between the dotted lines of ingot 12 in Fig. 1, also shown at 12b in Fig. 12 is composed of a welded deposit of tough metal having a relatively high coefficient of heat expansion, such as phosphor bronze; the brass being fused on top of phosphor bronze and filling the recesses between adjacent invar strips as before.

The main reason for making the center section 12b of a deposited tough metal like phosphor bronze instead of brass is to impart greater strength to the completed thermostatic element to enable it to withstand bending strains better than would otherwise be the case.

It is easier to fuse phosphor bronze to the invar steel than to fuse yellow brass to the invar steel and furthermore, it is easier to fuse brass to phosphor bronze than to invar steel so when using a center section of phosphor bronze as shown at 12b of Fig. 12 we have an ingot that is generally superior to a bimetallic ingot.

In Fig. 5A is shown another modification of the trimetallic ingot construction. Here it is proposed to fuse a facing of phosphor bronze 3x—3y—3z on one edge of each of the invar strips before they are assembled. This can readily be done by using the step blocks as shown in Fig. 4. The brass filling the space between adjacent invar strips in this case is fused on top of the phosphor bronze facing instead of the brass facing as before.

Relative to the various dimensions of the parts forming the compound ingot, whether of the bimetallic or trimetallic type, the deposited brass, horizontally spacing two adjacent strips of invar is equal to the thickness of the invar. The thickness of the deposited center section of high expansion metal vertically spacing the lower from the upper row of invar strips is approximately 25% of the width of the invar strip. The completed thermostatic element will be more sensitive when the ratio between the high expansion metal and low expansion metal through a vertical plane is about 5 to 4.

A modification of the process for making the compound ingots described in connection with Figs. 1 to 12 inclusive is to be used when making relatively thick ingots using relatively thin and wide invar strips. In this modification which will be described in connection with Figs. 15, 16, and 17 it is proposed to use hot rolled invar strips $\frac{1}{32}$" to $\frac{1}{8}$" thick by 2" wide.

Since the process rather than the apparatus is the subject of this invention, it will suffice to say that a standard milling machine such as used in any machine shop, with a few extra fittings will answer as the apparatus for this modification of the process.

Fig. 15 is a side elevation, partly in section, and Fig. 16 is a front elevation, partly in section of the milling machine having a horizontally and vertically adjustable carriage 20, with a refractory top slab 20a on which the base of the ingot 12 rests. The revolving arbor 21, supported by the swing arm 22 hanging from the post 23, rests on top of the right hand side of the ingot and is spaced from the top of the left hand side of the ingot by the metal gauge plate 24. The arbor 21 holds the three spaced refractory wheels 25a, 25b and 25c, and contains the tightly fitting heat resisting sleeves 21a and 21b.

The structural characteristics of the ingot made by the modified process is the same as for the ingot shown in Figs. 1 to 14 inclusive, it has two parallel rows of superposed alternating layers of invar and brass joined face to face, it has a center section of brass or of a tougher metal like phosphor bronze 12a or 12b uniting the two parallel rows of layers. The invar and brass layers are of the same thickness and the invar strips in one row are staggered in relation to the invar strips in the other row. The completed ingot has two broad surfaces with invar strips inlaid or imbedded in a mat of high expansion metal. The construction of Fig. 5A is preferred, in which a facing of phosphor bronze 3x is fused to one edge of the invar strip in a separate operation before the invar strip is joined to the ingot by a layer of brass.

We will assume that the ingot has been built up to the stage shown in Fig. 16 with a layer of deposited brass joining adjacent faces of two invar strips. The free end of the invar strip 1a being added to the ingot is heated to a dull red and bent over arbor 21 between refractory guide wheels 25b and 25c, the free end is held taut by the weight 26 joined to the invar strip by the flexible belt 27 guided over flanged idler pulley 28.

A flux coated filler rod of brass is now fused into the space 29 in three separate stages with the oxyacetylene flame. First a section of the top surface of invar strip 1b is heated to fusion temperature and a deposit of molten brass 30a is fused thereto, then a section of the under surface of invar strip 1a is heated to fusion temperature and a deposit of molten brass 30b is fused thereto. The top surfaces of brass deposits 30a and 30b are next brought up to fusion temperature and molten brass 30c fused thereto. The weight 26 is then lifted thus releasing the tension on the free end of invar strip 1a. While a flame is played on the brass deposits 30a, 30b and 30c to keep them in a plastic condition, hand wheel 31 is turned to move the carriage 20 with ingot 12 in the direction shown by the arrow 32. The plastic deposit of brass, which extends clear across the invar strips, has purposely been made somewhat thicker than necessary and is compressed and flattened to the required thickness under the influence of the arbor pressure. Compressing the plastic brass deposit has several advantages;—it makes the deposit more homogeneous and it squeezes out any surplus flux which otherwise might become imbedded in the deposit and cause hard spots. While moving the ingot forward the flame is also played upon that part of the invar strip bent around the arbor so that a small section of the bent invar will more readily straighten out and become a joined section of the ingot as it passes under the arbor.

Since the left hand side of the arbor is in contact with the gauge plate 24 the plastic brass will always be compressed to a uniform predetermined thickness. The refractory wheels 25b and 25c act as dams to prevent the molten or plastic brass from forcing its way out the sides of the ingot.

The procedure of fusing brass to a lateral section, then moving the ingot forward, compressing and gauging the brass, then depositing more brass is followed until the entire strip of invar 1a has been joined to the ingot, then a new strip of invar is added in the same manner to the left hand side of the ingot, as the gauge plate is moved to the right side under the arbor, and the weight and flexible belt are moved over to the left hand idler pulley. Thus a layer of brass and invar is first added to one side, then to the other side of the ingot.

The center section of brass 12a is deposited in layers at intervals, it being necessary only to keep the center groove deep enough to prevent interference with the guide wheel 25b.

The ingot when completed is rolled down into strips as shown in Fig. 17, the rolling operation being the same as that described in connection with Figs. 13 and 14.

In fusing the high expansion metal or metals to the invar steel I have used the oxy-acetylene torch flame because it has proved to be more positive in its action with the general run of welding operators, especially where yellow brass is to be welded to the invar steel. However, I find that electric arc welding may also be used to advantage with a saving in welding time, and cost of materials if the high expansion metal used as a filler rod has a high melting point. For instance, I have obtained satisfactory results depositing a facing of phosphor bronze on the fluxed invar strips, when set up as shown in Fig. 4, by the metallic arc and also the carbon arc processes. I have also had fair success fusing a layer of Everdur or phosphor bronze between two strips of invar steel by the metallic arc process using flux coated rods with reversed polarity without preheating the steel. I find however, that when using the metallic arc it is best to shield portions of the invar steel with nonconductors, so that the arc will be concentrated at the sections to be joined with the bronze or Everdur.

Thus far I have had success with only one electric arc process when attempting to fuse yellow brass to the invar steel, and that is with the Hanson arc torch. When fusing brass to the invar steel with the metallic or carbon arc processes the zinc in the brass vaporizes due to the high temperatures, leaving a very porous deposit of brass and a poor joint.

I have also succeeded in making the compound thermostatic ingots by pouring molten invar steel, heated to 2800° F., into parallel grooves in a brass slab and also in an Everdur slab which had previously been heated to about 1200° F. and the grooves fluxed with a mixture of powdered borax and fluoride. While in most cases I have been able to get a fused joint between the invar and the brass or Everdur by this method I find that the process is rather uncertain and if conditions are not exactly right the possibility of defective ingots is great. One defective ingot more than offsets the extra cost involved when using the slower process of fusing the molten brass to the invar with the oxy-acetylene torch.

Lastly, I have formed the compound thermostatic ingots by milling grooves in both broad faces of a slab of hot rolled Armco ingot iron and fused into the grooves molten invar from a flux coated invar filler rod, with the oxy-acetylene torch, after preheating the Armco iron slab.

After a strip of the compound thermostatic metal Fig. 14, has been reduced by rolling to the desired thickness it may be corrugated and formed into the thermostatic element shown in Fig. 18, or a strip like that shown in Fig. 19 may be bent into the form of a tube is shown in Fig. 20, with an oxy-acetylene welded longitudinal seam as shown at 20a, using a brass filler rod to make the longitudinal joint. Descriptive matter and the figures relating to a thermostatic Bourdon tube in patent application Serial No. 559,186 gives details relating to the type of tubing shown in Fig. 20.

The compound strip Fig. 21 may be bent into the tubular shape shown in Fig. 22 with the oxy-acetylene welded joint shown at 22a. This type of tubing is utilized in making thermostatic corrugated tubing as shown and described in my patent applications Serial No. 492,707 and No. 559,186.

Having described my invention, what I claim and desire to secure by Letters Patent is:—

1. The method of forming a metallic ingot comprising parallel spaced apart strips of one metal arranged in two side by side rows with the strips in one row staggered relatively to the strips in the other row and a second metal fused to and filling the space between said strips, which comprises the steps of first assembling two strips in one row and the strip in the second row similarly adjacent to said two strips, melting said second metal into the recess of which the bottom wall is formed by said strip and the side walls are formed by said two strips, successively assembling the remaining strips one at a time and alternately in the two rows to thereby successively form recesses similar to the first mentioned recess, and successively filling the successively formed recesses by melting said second metal thereinto.

2. In the manufacture of a compound metallic ingot comprising a series of parallel spaced apart strips of one metal and a second metal filling the spaces between said strips, the method steps which consist in assembling a plurality of said strips in gauged spaced relation to each other to define one or more spaces between said strips, and progressively fusing small portions of said other metal into each space between the strips so defined.

3. In the process of making a compound metallic ingot comprising a series of strips of one metal spaced apart from one another and a second metal filling the spaces between said strips, the method steps which consist in assembling a plurality of said strips in a jig or form in gauged spaced relation thereby producing one or more recesses between said strips, fusing a small area of the side walls and base of a recess so formed and melting said other metal into the fused portion of the recess and progressively extending the fusing and melting operations until each such recess has been filled with the second metal.

4. In the manufacture of a compound thermostatic metal ingot comprising spaced apart striplike portions of a metal having a relatively low coefficient of heat expansion, and a second metal having a relatively high coefficient of heat expansion filling the spaces between said portions, the method steps which consist in assembling a plurality of said strip portions in spaced relation in a jig or fixture whereby a plurality of recesses between said strips are formed, fusing the side wall and bottom wall of a small portion of one of said recesses, melting said second metal into said recesses and progressively extending the fusing and melting operation until said recess has been filled with said second metal fused to the wall of the space and successively and similarly filling each other recess of said plurality with said second metal.

5. In the manufacture of a compound thermostatic metal ingot comprising spaced apart strips of invar steel and brass filling the spaces between said strips, the method steps which consist in assembling a plurality of said strips in spaced relation to form a plurality of recesses between the strips, fusing the walls of a small portion of one of said recesses and melting brass into said portion and progressively extending the fusing and melting operation until said recess has been filled with brass fused to the walls of the recess and thereafter to similarly and successively fill the remaining recesses.

6. In the manufacture of a compound thermostatic metal ingot comprising two rows of parallel spaced apart strips of invar steel with the strips in one row spaced away from and staggered with respect to the strips in the other row and a second metal of high heat expansion filling the space between the adjacent edges of the strips of the two rows and a third high expansion metal of different composition from said second metal filling the spaces between the strips in each row, which comprises the steps of fusing said second metal into place to thereby connect strips in each row to strips in the other row while maintaining the strips so connected in spaced relation and filling each recess of which a side by side pair of strips form the side walls and said second metal forms the bottom wall, by fusing the third metal into said recess.

7. In the manufacture of a compound thermostatic ingot comprising spaced apart strips of one metal and other metal filling the spaces between and connecting the said strips and having a different coefficient of expansion from said one metal, the method which consists in progressively fusing said other metal into place between said strips while maintaining the latter in their spaced relation.

NORMAN L. DERBY.